United States Patent
Yano et al.

(10) Patent No.: US 6,700,637 B2
(45) Date of Patent: *Mar. 2, 2004

(54) RESIN LIQUID-CRYSTAL CELL SUBSTRATE, LIQUID-CRYSTAL CELLS AND LIQUID-CRYSTAL DISPLAY DEVICE

(75) Inventors: Shuuji Yano, Osaka (JP); Seiji Umemoto, Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,051

(22) Filed: May 23, 2000

(65) Prior Publication Data

US 2002/0163605 A1 Nov. 7, 2002

(30) Foreign Application Priority Data

May 24, 1999 (JP) ........................ P. 11-143494

(51) Int. Cl.$^7$ ................ G02F 1/1333; G02F 1/1335; F21V 7/04
(52) U.S. Cl. ................ 349/158; 349/62; 349/113; 362/31
(58) Field of Search ............. 349/158, 63, 62, 349/113; 362/26, 27, 31, 330

(56) References Cited

U.S. PATENT DOCUMENTS

| | | | |
|---|---|---|---|
| 5,235,660 A | 8/1993 | Perry et al. | |
| 5,353,154 A | 10/1994 | Lutz et al. | |
| 5,482,658 A | 1/1996 | Lebby et al. | |
| 5,548,670 A * | 8/1996 | Koike | 385/146 |
| 5,626,800 A | 5/1997 | Williams et al. | 264/1.38 |
| 5,645,901 A | 7/1997 | Fukuchi et al. | 428/1 |
| 5,779,337 A * | 7/1998 | Saitoh et al. | 362/31 |
| 5,810,464 A * | 9/1998 | Ishikawa et al. | 362/31 |
| 5,833,878 A * | 11/1998 | Shinohara | 252/299.01 |
| 5,900,287 A | 5/1999 | Williams | 427/510 |
| 6,011,601 A * | 1/2000 | Kojima | 349/62 |
| 6,027,220 A * | 2/2000 | Arai | 362/19 |
| 6,049,649 A * | 4/2000 | Arai | 385/133 |
| 6,104,854 A * | 8/2000 | Masaki et al. | 385/133 |
| 6,196,691 B1 * | 3/2001 | Ochiai | 362/31 |
| 6,196,692 B1 * | 3/2001 | Umemoto et al. | 362/31 |
| 6,239,851 B1 * | 5/2001 | Hatazawa et al. | 349/62 |
| 6,345,899 B1 * | 2/2002 | Ohkawa et al. | 349/61 |
| 6,379,017 B2 * | 4/2002 | Nakabayashi et al. | 362/31 |

FOREIGN PATENT DOCUMENTS

| | | | | |
|---|---|---|---|---|
| EP | 0 788 013 A2 | 8/1997 | ......... | G02F/1/1343 |
| JP | 7-333476 | 12/1995 | | |
| JP | 9-040816 | 2/1997 | | |
| JP | 10-161113 | 6/1998 | ........... | G02F/1/335 |
| JP | 10-188636 | * 7/1998 | | |
| TW | 242666 | 3/1995 | | |
| TW | 247944 | 5/1995 | | |
| TW | 264431 | 12/1995 | | |
| TW | 292298 | 12/1996 | | |

* cited by examiner

*Primary Examiner*—Tarifur R. Chowdhury
(74) *Attorney, Agent, or Firm*—Sughrue Mion, PLLC

(57) ABSTRACT

A liquid-crystal cell substrate constituted by a sheet which has a thickness in a range of from 0.1 to 1 mm and is made of a resin with a glass transition temperature of not lower than 130° C. and provided with light output means on one of upper and lower surfaces of the sheet so that light incident on a side surface is delivered out of the one of the upper and lower surfaces through the light output means. Liquid-crystal cells constituted by two cell substrates, and a liquid crystal enclosed in between the two cell substrates, wherein one of the two cell substrates is constituted by a liquid-crystal cell substrate. A liquid-crystal display device constituted by such liquid-crystal cells.

11 Claims, 1 Drawing Sheet

RESIN LIQUID-CRYSTAL CELL SUBSTRATE, LIQUID-CRYSTAL CELLS AND LIQUID-CRYSTAL DISPLAY DEVICE

BACKGROUND OF THE INVENTION

1. Field of the Invention

The present invention relates to a resin liquid-crystal cell substrate which serves also as a light pipe and which can form a liquid-crystal display device excellent in reduction of both thickness and weight.

The present application is based on Japanese Patent Application No. Hei. 11-143494, which is incorporated herein by reference.

2. Description of the Related Art

A liquid-crystal display device in which a surface light source constituted by a side light type light pipe is disposed on the visual recognition back surface side (back side) or visual recognition side (front side) of liquid-crystal cells is heretofore known as a transmission type or reflection-transmission dual type liquid-crystal display device. Greater reduction in both thickness and in weight has been, however, eagerly demanded to use the advantage of the liquid-crystal display device effectively with the advance of popularization of the liquid-crystal display device into various kinds of fields. To achieve such greater reduction both in thickness and in weight has been a theme.

SUMMARY OF THE INVENTION

An object of the present invention is to achieve greater reduction both in thickness and in weight of a liquid-crystal display device in compliance with the aforementioned demand.

According to the present invention, there is provided a liquid-crystal cell substrate comprising a sheet which has a thickness in a range of from 0.1 to 1 mm and is made of a resin with a glass transition temperature of not lower than 130° C. The sheet is provided with light output means on one of upper and lower surfaces of the sheet. Light incident on a side surface is delivered out of the one of the upper and lower surfaces through the light output means. Further, a liquid-crystal cell comprises two cell substrates, and a liquid crystal enclosed in between the two cell substrates, wherein one of the two cell substrates is constituted by the aforementioned liquid-crystal cell substrate. A liquid-crystal display device is constituted by such a liquid-crystal cell.

The cell substrate according to the present invention is light in weight because the cell substrate is made from resin. The cell substrate may be used as a light pipe and as a cell substrate. A side light type light pipe may be formed so as to be used as a surface light source by disposing a light source on a side surface of liquid-crystal cells using such a substrate or on a side surface of the substrate. As a result, the background-art back light or front light can be omitted. A liquid-crystal display device can be formed as an illumination system quite different from the background-art transmission type or reflection-transmission dual type liquid-crystal display device. Greater reduction both in thickness and in weight of the liquid-crystal display device can be achieved.

Features and advantages of the invention will be evident from the following detailed description of the preferred embodiments described in conjunction with the attached drawings.

DETAILED DESCRIPTION OF THE PREFERRED EMBODIMENTS

Figure 1:
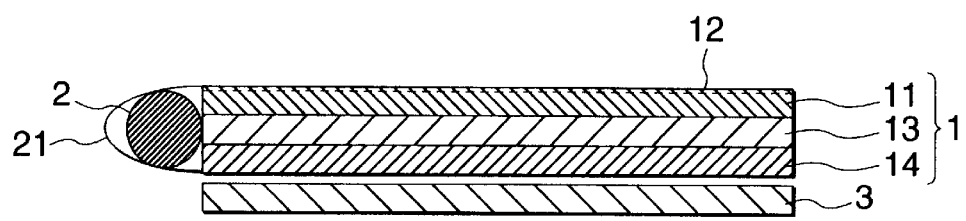
FIG. 1 shows a sectional view of an example of a liquid-crystal display device.

The liquid-crystal cell substrate according to the present invention has a sheet which has a thickness in a range of from 0.1 to 1 mm and which is made of a resin with a glass transition temperature of not lower than 130° C. and provided with light output means on one of upper and lower surfaces of the sheet so that light incident on a side surface is delivered out of the one of the upper and lower surfaces through the light output means.

Any suitable resin having a glass transition temperature of not lower than 130° C. can be used as the resin for forming the sheet. If the resin having a glass transition temperature lower than 130° C. is used, there is a possibility that the cell substrate may be deformed because of shortage of heat resistance when a transparent electrode of an ITO vapor deposition film, or the like, is provided on the cell substrate.

The resin preferably used for forming the sheet has a glass transition temperature of not lower than 150° C. and is excellent in chemical resistance, surface hardness, transparency, optical isotropy, low water absorbency, low moisture permeability and gas barrier, especially excellent in low oxygen permeability. Incidentally, examples of the resin include thermosetting resins such as epoxy resin, polydiallyl phthalate, unsaturated polyester, polyisobornyl methacrylate, etc., and thermoplastic resins such as polyallylate, polyether-sulfone, polyether-imide, polycarbonate, polysulfone, polyamide, etc.

In the above description, epoxy resin is preferably used as a thermosetting resin from the point of view of low moisture permeability, etc. Particularly, alicyclic epoxy resin or triglycidyl isocyanurate is preferably used singly, or a mixture thereof is preferably used. Although a curing agent for the resin is not particularly limited, for example, an acid anhydride type curing agent has an advantage that a cured substance excellent in transparency and colorlessness can be obtained easily.

One kind or two or more kinds selected from the aforementioned thermosetting and thermoplastic resins can be used. The resin may be used as a copolymer, a mixture, etc. in combination with another component if the glass transition temperature is kept 130° C. or higher. Examples of the component which can be copolymerized with the thermosetting resin include methyl methacrylate, ethyl methacrylate, styrene, and vinyl monomer such as divinylbenzene.

On the other hand, examples of the component which can be mixed or copolymerized with the thermoplastic resin include polymethyl methacrylate, polyethyl methacrylate, polystyrene, vinyl resins such as polyvinyl chloride, polyvinylidene chloride and polyvinyl alcohol, olefin resins such as polyethylene and polypropylene, cellulose resins such as triacetyl cellulose and diacetyl cellulose, and monomers for forming these resins. Incidentally, polyallylate, polycarbonate or an alloyed compound containing polyester resin added to polyallylate or polycarbonate is excellent in heat resistance, chemical resistance, moldability, etc.

The characteristic in which light incident on a side surface is output from one of upper and lower surfaces can be given by providing light output means on one of the upper and lower surfaces of the sheet. Such light output means may be formed from any suitable material having a function in which light incident on a side surface and transmitted in the inside of the sheet or in the inside of liquid-crystal cells is delivered out of one surface side of the sheet, particularly at a surface side opposite to the light output means-forming surface of the sheet by diffusion, reflection, diffraction, interference, etc. The material is not particularly limited in terms of kind.

Incidentally, an example of the foregoing light output means includes a diffusing or scattering body, for example, constituted by dot-like irregularities, stripe-like irregularities, or the like, or a reflection body constituted by fine prism-like irregularities, which is formed on the light output surface or opposite rear surface of a light pipe as a known side light type back light in a liquid-crystal display device.

Accordingly, the light output means may be shaped into any suitable form such as dot-like irregularities each having a protrusion, a recess or a cone shaped like a circle, an ellipse or a polygon such as a quadrilateral, or fine prism-like irregularities each shaped like a triangle, a trapezoid, or the like, in sectional view. It is preferable that the light incident on a side surface is transmitted without any absorption and delivered out of one surface of the sheet efficiently.

The light output means preferred from the aforementioned point of view is one constituted by a repetition structure of prism-like irregularities which have (steep) slopes inclined at an angle in a range of from 30 to 60 degrees, especially 50 degrees or less, particularly in a range of from 35 to 45 degrees with respect to a reference plane of the sheet so that light incident on a side surface is reflected through the slopes so as to be output to one surface side of the sheet. Incidentally, when it is necessary to recognize liquid-crystal display visually through the sheet, prism-like irregularities using the aforementioned steep slopes in combination with easy slopes inclined at an angle in a range of from 0 to 10 degrees with respect to the reference plane of the sheet may be used from the point of view of achievement of good visual recognition. In this case, the prism-like irregularities may be preferably formed so that the projected area of the easy slopes on the reference plane of the sheet is not smaller than 5 times, especially 10 times, particularly 15 times as large as the projected area of the steep slopes on the reference plane of the sheet.

Incidentally, the repetition pitch of the prism-like irregularities may be preferably set to be in a range of from 50 μm to 1.5 mm from the point of view of prevention of occurrence of moire due to interference with pixels of the liquid-crystal cells, etc. in consideration of the fact that the pitch of pixels of the liquid-crystal cells is generally in a rage of from 100 to 300 μm. Incidentally, the pitch may be constant or may be irregular for example, as a random pitch or as a random or regular combination of a predetermined number of pitch units.

The formation of the sheet for use in the liquid-crystal cell substrate can be performed by a suitable method such as a cast molding method, a transfer molding method, a flow-cast molding method, an injection molding method, a roll-coat molding method, an extrusion molding method, a casting molding method, a reactive injection molding method (RIM), etc. For the formation of the sheet, a suitable additive such as a dye, a denaturant, an anti-discoloring agent, an anti-oxidizing agent, an ultraviolet absorber, a releasant, etc. may be mixed as occasion demands.

In the above description, the sheet having the light output means can be also formed by a cutting method, that is, can be formed by any suitable method. Examples of the producing method preferred from the point of view of mass production, etc. include a method of transferring a shape by hot-pressing a thermoplastic resin against a metal mold capable of forming a predetermined shape, a method of filling a mold capable of forming a predetermined shape with a hot-melted thermoplastic resin or a resin fluidized by heat or through a solvent, a method of performing polymerization after filling a metal mold capable of forming a predetermined shape with a liquid resin polymerizable by heat, ultraviolet rays, radiation, or the like, or after casting the liquid resin into the mold, and so on.

Incidentally, the sheet for forming the liquid-crystal cell substrate may be formed as a laminate, or the like, of sheets made of one kind of material or of different kinds of materials, such as a laminate of a sheet having light output means formed thereon and another sheet adhesively bonded to the sheet. That is, the sheet for forming the liquid-crystal cell substrate need not be formed as an integral single layer made of one kind of material. The thickness of the sheet for forming the liquid-crystal cell substrate is set to be in a range of from 0.1 to 1 mm, especially in a range of from 0.2 to 0.8 mm, from the point of view of achievement of reduction in thickness and weight of the liquid-crystal display device, characteristic such as strength required for the substrate, etc.

As occasion demands, a reflection layer may be provided on the sheet surface having the light output means formed thereon for the purposes of controlling the light path of transmitted light securely through the light output means, preventing leakage of the transmitted light through the sheet surface, etc. The reflection layer may be provided as a coating layer, or the like, so as to come into close contact with the sheet or may be disposed as a reflection plate, or the like.

Accordingly, the reflection layer may be formed into a suitable mode such as a coating layer formed by mixing powder of a suitable metal or alloy with a binder resin; a metal thin-film attachment layer formed by evaporating the metal, or the like; a metal powder mixed sheet; a metal powder mixed layer; a resin sheet attached with a metal powder mixed layer or a metal thin film; metal foil; etc. Incidentally, as the aforementioned metal or alloy, a material containing at least one member selected from the group of high-reflectivity metals such as aluminum, silver, gold, chrome, etc. can be used preferably from the point of view of reflectivity.

Further, the reflection layer to be formed may be of a diffuse type capable of diffusing reflected light for the purpose of uniformity of brightness on the whole surface of the sheet, etc. For example, the diffuse type reflection layer may be formed by a method in which: a surface of a sheet is roughened as fine irregularities by a suitable method such as a surface roughening method using a matting treatment such as sandblasting, a method of giving fine irregularities through a metal mold, or the like, when the sheet is formed, a method of impregnating the sheet with a transparent resin or a method of attaching a resin layer containing such particles; and a reflection layer is formed on the surface so that the fine irregularities on the sheet surface is reflected on the surface of the reflection layer.

Further, the diffuse type reflection layer may be also formed by a method based on a mixed substance of metal powder, or the like, or a method of roughening a surface of metal foil or the aforementioned metal thin film by a pressure roll method, or the like. Incidentally, a suitable coating layer may be provided on the reflection layer as occasion demands for the purpose of improvement of reflectivity, prevention of oxidation, etc.

Incidentally, any one of the aforementioned materials for forming the substrate sheet may be used as the resin sheet for supporting the aforementioned reflection layer. Moreover, a suitable film of plastics such as triacetyl cellulose, polyvinyl alcohol, polyimide, polyallylate, polyester, polysulfone or polyether sulfone may be also used as the resin sheet.

As described above, the substrate sheet itself may have a fine unevenness structure as its surface for the purpose of diffusion of light, prevention of occurrence of moire, etc. In this case, the surface fine unevenness structure may be formed on one or both of the front and rear surfaces of the sheet. Accordingly, the surface having no light output means may be formed to have such a fine unevenness structure. Incidentally, in the above description, the surface fine unevenness structure may be preferably formed as the front surface layer of the sheet from the point of view of supplying transmitted light even to the rear portion of the sheet stably to achieve uniformity of the brightness on the whole surface of the sheet, etc.

The sheet preferably used as the liquid-crystal cell substrate is hard to transmit gases such as oxygen, water vapor, etc. and is excellent in light transmissivity as described above. When the cell substrate sheet is short of such performance or when the performance is to be improved, a gas barrier layer, or the like, may be added to the sheet as occasion demands.

For example, the aforementioned gas barrier layer may be formed as an organic layer of a polymer coating film, or the like, or as an inorganic vapor deposition layer of silica, or the like. The preferred from the point of view of forming efficiency, etc. is a polymer which can be added as a coating film. Examples of the polymer include polymers small in oxygen permeability coefficient, such as polyvinyl alcohol, partially saponified polyvinyl alcohol, ethylene-vinyl alcohol copolymer, polyacrylonitrile, polyvinylidene chloride, etc. Incidentally, the formation of the coating film can be performed by a suitable method such as a casting method, a spin coating method, etc.

A suitable functional layer such as a hard coating layer made of a silicone curable resin, or the like, for the purpose of improvement of the surface hardness, etc., or a primer layer for the purpose of improvement of the property of close contact with a transparent electrode can be also provided on the cell substrate sheet. Accordingly, the liquid-crystal cell substrate according to the present invention may be formed as a monolayered or laminated body of the aforementioned sheet, or as a multilayered body of a superposed body of various functional layers on the aforementioned monolayered or laminated body used as its base layer.

The liquid-crystal cell substrate according to the present invention is used on only one surface side of the liquid-crystal cells. That is, for example, the liquid-crystal cells can be formed by a method of enclosing a liquid crystal in between liquid-crystal cell substrates after forming transparent electrodes on the liquid-crystal cell substrate respectively and disposing the liquid-crystal cell substrates opposite to each other. In this case, the liquid-crystal cell substrate made of the sheet having the light output means formed thereon is used on one surface side of the liquid-crystal cells. As a result, a good visual recognition property can be secured.

Figure 2:
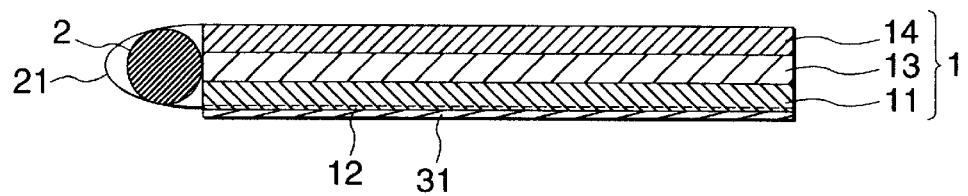
FIG. 2 shows a sectional view of another example of a liquid-crystal display device.

FIGS. 1 and 2 show examples of the liquid-crystal cells. The reference numeral 1 designates liquid-crystal cells; 11, a liquid-crystal cell substrate having light output means 12 according to the present invention; 13, a liquid-crystal layer enclosed in between substrates 11 and 14; and 14, the other liquid-crystal cell substrate having no light output means. Incidentally, the reference numeral 2 designates a light source disposed on a side surface of the liquid-crystal cells; 21, a reflector for surrounding the light source 2; 3, a reflection layer constituted by a reflection plate; and 31, a reflection layer constituted by a vapor deposition film.

As shown in the drawings, the liquid-crystal cell substrate 11 according to the present invention can be used in either mode of the visual recognition side of the liquid-crystal cells 1 or the visual recognition back side thereof. Further, the liquid-crystal cell substrate 11 according to the present invention may be used so that the surface on which the light output means 12 is formed is disposed on the inner side of the liquid-crystal cells. The liquid-crystal cell substrate 11 according to the present invention is, however, generally used so that the surface on which the light output means 12 is formed is disposed on the outer side of the liquid-crystal cells from the point of view of formability of the aforementioned transparent electrode, etc. As the other cell substrate 14 in the liquid cells, may be used a suitable substrate according to the background art, such as a resin substrate or a glass substrate made of the aforementioned sheet having no light output means.

Incidentally, the formation of the aforementioned transparent electrode can be performed by a suitable method according to the background art, such as a method in which: a transparent electrically conductive film is formed on the cell substrate by a suitable method such as an evaporation method using sputtering, or the like, of a transparent electrode-forming material such as tin oxide, indium oxide, gold, platinum or palladium, a method of applying a transparent electrically conductive coating, etc.; and the transparent electrically conductive film is patterned as an electrode. The liquid-crystal arrangement oriented film provided on the transparent electrode as occasion demands can be also formed by a suitable method according to the background art.

For the formation of the liquid-crystal display device, as shown in the drawings, liquid-crystal cells are of a mode having a light source 2 on a side surface of the liquid-crystal cells 1 or on a side surface of the liquid-crystal cell substrate 11 according to the present invention. A suitable material can be used as the light source. For example, a linear light source made of a linear or surface array body such as a (cold or hot) cathode tube, a light-emitting diode, etc. may be preferably used as the light source.

For the formation of the liquid-crystal display device, suitable auxiliary means such as a reflector 21 for surrounding the light source 2 to lead scattered light from the light source to a side surface of the liquid-crystal cells, or the like, as shown in the drawings may be disposed as occasion demands. A resin sheet coated with a metal thin film of high reflectivity, metal foil, or the like, is generally used as the reflector. Further, the reflector may be provided so as to extend to the lower surface of the liquid-crystal cells so that the reflector can serve also as a reflection sheet. Further, for the formation of a reflection-transmission dual type liquid-crystal display device, a mechanism which can switch the light source on/off, or the like, may be provided.

The liquid-crystal cell substrate may be provided for forming the liquid-crystal cells in a state in which other materials such as a polarizing plate, a phase difference plate, etc. for forming the liquid-crystal display device are laminated on the liquid-crystal cell substrate as occasion demands. The liquid crystal cells to be formed may be selected from a TN type, an STN type, a guest-host type, a TFT type, a ferroelectric liquid-crystal cell type, etc. at option. Further, various types of liquid-crystal display devices according to the background-art reflection type, transmission type and reflection-transmission dual type liquid-crystal display devices may be formed.

EXAMPLE 1

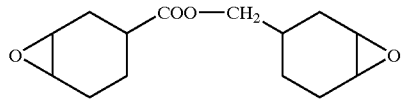

A mixture consisting of 100 parts (parts by weight, the same rule will apply hereunder) of an alicyclic epoxy resin represented by the above-described chemical formula, 124 parts of methylhexahydrophthalic anhydride, and 1 part of tri-n-butyloctylphosphonium bromide was poured into a metal mold shaped into a form for forming light output means constituted by prism-like irregularities. The mixture was cured at 100° C. for 2 hours and further at 170° C. for 16 hours. Thus, a resin sheet, which was 0.7 mm thick and which had one surface provided with light output means constituted by prism-like irregularities, and the other surface being smooth, was obtained.

A mixture solution containing 30 parts of methyltrimethoxysilane, 45 parts of isopropyl alcohol, 30 parts of water and 0.06 parts of acetic acid was applied onto the smooth surface of the foregoing resin sheet and heated at 170° C. for 1 hour to thereby add a hard coating layer about 2 $\mu$m thick to the resin sheet. Thus, a liquid-crystal cell substrate was obtained.

There were used the liquid-crystal cell substrate having the foregoing light output means and a liquid-crystal cell substrate formed in the same manner as described above except that the light output means was not provided. ITO transparent electrodes were formed on the substrates respectively by an evaporation method. A liquid crystal was enclosed in between the substrates to thereby form liquid-crystal cells. Then, a cold-cathode tube was disposed on a side surface of the liquid-crystal cells and a reflection plate was disposed on the visual recognition back surface side of the liquid-crystal cells. Thus, a cholesteric liquid-crystal reflection display device having a structure shown in FIG. 1 was formed. Incidentally, the surface on which the light output means was formed was disposed on the outer side of the cells. When the front light type device thus obtained was visually recognized through the light output means-forming surface, a good display quality was achieved.

EXAMPLE 2

Guest-host type liquid-crystal cells were formed in accordance with Example 1 except that a reflection layer 50 nm thick was formed on the light output means-forming surface by evaporating silver. A cold-cathode tube was disposed on a side surface of the liquid-crystal cells to thereby form a reflection type liquid-crystal display device having a structure shown in FIG. 2. When the back light type device thus obtained was visually recognized through the substrate side having no light output means, a good display quality was achieved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal cell substrate comprising a resin with a glass transition temperature of not lower than 130° C., said liquid crystal cell substrate being shaped into a sheet with a thickness in a range of from 0.1 to 1 mm, and having light output means provided on one of upper and lower surfaces of said sheet so that light incident on a side surface is delivered out of said one of upper and lower surfaces through said light output means;

wherein said light output means comprises prism-like irregularities having steep slopes of 30 to 60 degrees with respect to a reference plane of the sheet.

2. A liquid-crystal cell substrate comprising a resin with a glass transition temperature of not lower than 130° C., said liquid crystal cell substrate being shaped in to a sheet with a thickness in a range of from 0.1 to 1 mm, and having light output means provided on one of upper and lower surfaces of said sheet so that light incident on a side surface is delivered out of said one or upper and lower surfaces through said light output means;

wherein said light output means comprises dot-like irregularities.

3. A liquid-crystal cell substrate according to claim 1, further comprising a reflection layer disposed on the surface on which said light output means is formed.

4. A liquid-crystal cell comprising two cell substrates, and a liquid crystal enclosed in between said two cell substrates, wherein one of said two cell substrates is constituted by a liquid-crystal cell substrate according to any one of claims 1 to 3.

5. A liquid-crystal cell according to claim 4, wherein said light output means is formed on a surface of said liquid-crystal cell substrate disposed outside said cell.

6. A liquid-crystal cell according to claim 4, further comprising a light source disposed on a side surface of said cells.

7. A liquid-crystal display device comprising a liquid-crystal cell according to claim 4.

8. A liquid-crystal display device comprising a liquid-crystal cell according to claim 5.

9. A liquid-crystal display device comprising a liquid-crystal cell according to claim 6.

10. A liquid crystal substrate according to claim 1, wherein the light is delivered out through another of upper and lower surfaces which is opposite to said light output means.

11. A liquid-crystal cell substrate according to claim 1, wherein said light output means comprises prism-like irregularities having easy slopes of 0 to 10 degrees with respect to a reference plan of the sheet.

* * * * *